United States Patent [19]

Zabotto et al.

[11] 4,087,253

[45] May 2, 1978

[54] METHOD OF OBTAINING CAUSTIC SODA FROM A SODIUM CHLORIDE LIQUOR CONTAINING SULPHATE IONS RECOVERED FROM AN ELECTROLYTIC CELL

[75] Inventors: Guy Zabotto, Paris; Jean-Marie Guichard, Martigues; Daniel Fournier, Paris, all of France

[73] Assignee: Rhone-Poulenc Industries, Paris, France

[21] Appl. No.: 670,417

[22] Filed: Mar. 25, 1976

[30] Foreign Application Priority Data

Mar. 28, 1975  France .............................. 75 09799

[51] Int. Cl. ........................... B01d 9/02; C01d 1/04
[52] U.S. Cl. .................................... 23/297; 23/299; 23/302 T; 23/303; 423/499; 423/183; 423/641; 423/551; 159/47 WL
[58] Field of Search ................. 23/296, 297, 299, 300, 23/302 R, 302 T, 303; 159/45 R, 47 WL; 423/499, 641, 182, 183, 551

[56] References Cited

U.S. PATENT DOCUMENTS

| 2,753,242 | 7/1956 | Davis | 23/303 X |
| 3,332,470 | 7/1967 | Chirico et al. | 159/DIG. 34 |
| 3,362,457 | 1/1968 | Chirico | 23/296 X |
| 3,712,797 | 1/1973 | Winkler | 23/303 X |
| 3,854,299 | 12/1974 | Myers et al. | 23/302 X |

FOREIGN PATENT DOCUMENTS 2,432,808  1/1975  Germany .............................. 423/641

Primary Examiner—Stephen J. Emery

[57] ABSTRACT

A method of obtaining caustic soda and pure sodium chloride from an electrolytic cell liquor containing also sulfate ions including the steps of concentrating the liquor through multiple effect evaporation, cooling the concentrate obtained, separating the sodium chloride and the salt containing sulfate and recovering the caustic soda, whereby during a first stage the liquor is evaporated so as to precipitate only sodium chloride which is removed, in a second stage a solid phase is formed of sodium chloride, sodium sulfate and triple salt of caustic soda, sodium chloride and sodium sulfate, with said solid phase being contacted with a caustic soda solution of less than about 35% by weight concentration, so as to decompose said triple salt, removing the salt containing sulfate, and in a third stage the solution from the second stage is cooled to precipitate said triple salt of caustic soda, sodium chloride and sodium sulfate, which is separated from the caustic soda which does not crystallize and is removed from the system, and the resulting solid phase which remains is collected and is recycled into the initial electrolytic cell liquor.

4 Claims, 1 Drawing Figure

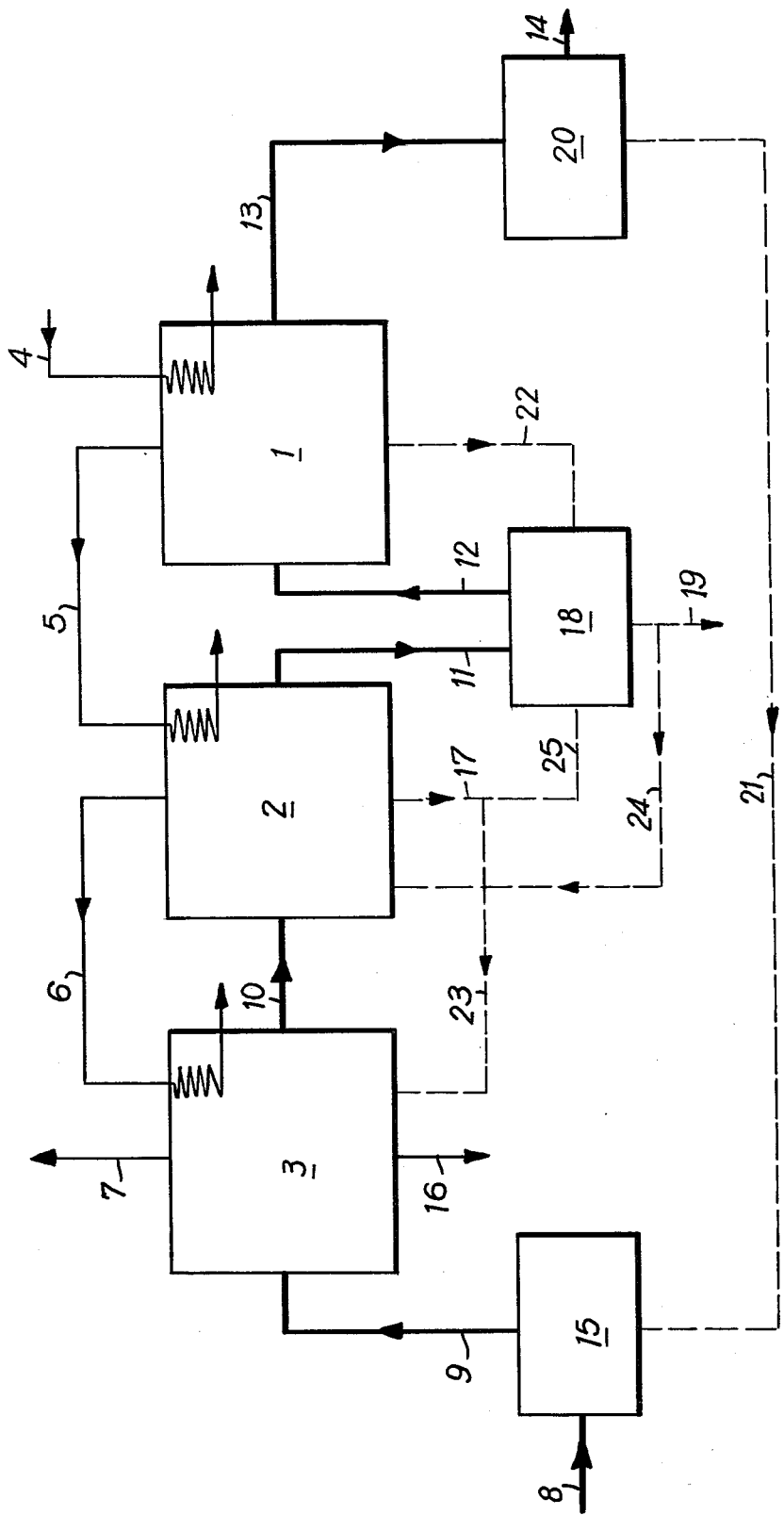

METHOD OF OBTAINING CAUSTIC SODA FROM A SODIUM CHLORIDE LIQUOR CONTAINING SULPHATE IONS RECOVERED FROM AN ELECTROLYTIC CELL

BACKGROUND OF THE INVENTION

The invention relates to a method of obtaining caustic soda and pure sodium chloride from a sodium chloride-containing liquor also containing sulphate ions and supplied by or recovered from an electrolytic cell.

Caustic soda liquors supplied by an electrolytic cell have a relatively low concentration of caustic soda, in order of 10 to 15% by weight, and a sodium chloride content in the order of 15% by weight. But such liquors generally contain small quantities of other compounds which act as impurities. These impurities include sulphate ions. Sulphate ions interfere with the recovery of the caustic soda and sodium chloride in a pure state.

Various methods have already been proposed for recovering the caustic soda and sodium chloride. One method comprises concentrating the initial liquor by evaporating part of the water contained in it, then cooling the concentrate and finally separating the soda solution from the precipitate thus formed. Various means have been advocated for carrying out such a process. Thus, French Pat. No. 2,158,301 claims the cooling of the concentrated solution by direct contact with a liquid coolant such as liquid butane. However, such a method involves expenditure on a compound which in itself is foreign to the process.

Moreover, the foregoing method of concentrating by evaporation entails high expenditure on thermal energy, since the water contained in the solution has to be evaporated. In similar cases it is known to be economically advantageous to make use of the multiple effect technique; this comprises re-utilizing the steam given off in one evaporator for heating another evaporator, identical with the first and operating at a lower temperature. In this way, a plurality of evaporators may be combined in series. This enables considerable economies to be made in steam consumption and thus in heat. In practice, one is limited by the cost of the installations. This means that a compromise has to be made between capital costs and operating costs. Furthermore, one must take into account the phases involved in carrying out the process.

Thus, in the case of soda liquors from electrolytic cells, the caustic soda and sodium chloride are often required to be separated and extracted separately. The sodium chloride may be collected in the form of a pure salt or a salt containing sodium sulphate. However, the salt containing sulphate is not in itself a useful product, so the quantity recovered has to be reduced as much as possible. One is, therefore, led to consider the balances obtained in each action or stage and to experiment with the concentrations of each constituent of the solution and with the temperature of the solution in order to determine operating conditions for each phase of the process.

In theory, these conditions can be ascertained from equilibrium graphs covering the constituents of the system, i.e., in this case water, sodium chloride, sodium sulphate, and, of course, caustic soda. These graphs show the precipitation of complex salts, made up of sodium chloride, sodium sulphate and soda, such as the triple caustic salt or double salts, during the concentration of aqueous solutions of caustic soda.

It has also been observed that these salts and, particularly the triple salt, are difficult or impossible to decompose in caustic soda solutions, due to secondary phenomena in certain phases of the process.

It is, accordingly, an object of the present invention to provide a process for obtaining caustic soda, pure sodium chloride from an electrolytic cell liquor containing sulphate ions as an impurity.

It is also an object of the present invention to provide such a process which avoids the disadvantages of prior art processes.

Another object of the invention is to employ a multiple-effect technique, thus economizing in heating energy, whereby the number of effects is limited so as not to require installations where capital and maintenance costs would be too high.

A further object of the invention is to optimize the yield of pure sodium chloride, while minimizing extraction of salt containing sulphate without any triple salt and thereby reducing losses of caustic soda.

A still further object is to obtain the caustic soda and sodium chloride in very pure state, employing a process which is highly flexible.

Other objects will be apparent to those skilled in the art from the present description, taken in conjunction with the appended drawing, which is a flow diagram of one process in accordance with the present invention.

GENERAL DESCRIPTION OF THE INVENTION

The process of the invention is a method of obtaining caustic soda and sodium chloride from an electrolytic cell liquor containing sulphate ions, by concentrating the liquor through multiple-effect evaporation, cooling the concentrate obtained, separating the sodium chloride and the salt containing sulphate and recovering the caustic soda, characterized in that during a first stage the solution is treated under conditions of temperature and concentration such that only sodium chloride precipitates from it and is collected. In a second stage, a solid phase is formed of sodium chloride, sodium sulphate and triple caustic salt of soda, sodium chloride and sodium sulphate, the solid phase being treated with a caustic soda solution of a concentration below 35% by weight, so as to decompose the triple salt, and the salt containing sulphate is separated. In the third stage, the solution from the second stage is finally cooled so as to precipitate the triple salt of caustic soda, sodium chloride and sodium sulphate, and the triple salt is separated from the soda obtained, which is extracted, and that the solid phase is collected at a stage during which it is dissolved.

It is advantageous for the solid phase to be recycled to an upstream stage in the process, to a point where it is in conditions such that it is dissolved.

Without going beyond the scope of the invention, one could, of course, treat the solid phase with any dissolving medium such as water, at a fourth stage.

In a preferred embodiment, however, at least part of the solid phase is recycled to a point in the process where the liquor is unsaturated with sodium sulphate and sodium chloride. Deposits are then found to form on lesser heated surfaces. It is a simple procedure for recycling to be carried out at the level of the initial liquor.

If the largest possible quantity of sodium chloride and caustic soda are to be recovered, however, it is known to be important for the caustic soda solution at the end of the first stage to be close to the point of saturation with sodium sulphate.

This effect can be obtained, whatever the concentration of sulphate ions in the initial liquor and allowing for the recycling of the triple salt and sodium chloride at the third step, by taking out part of the salt containing sulphate, precipitated at the end of the first stage and extracting it, e.g., at the second stage with the triple salt, in cases where the initial liquor is too rich in sulphate ions. Alternatively, by recycling part of the salt containing sulphate precipitated at the second stage to the end of the first stage, in cases where the intial liquor does not contain enough sulphate ions.

The conditions relating to the concentration of constituents and the temperature can be determined by those skilled in the art from standard equilibrium graphs. These graphs have already been studied in research work, e.g., by IKTINA, published in the scientific literature, see, e.g., Izv. Sik Kora Fiz Khim. Anal.
Inst. Obshch Neorg Khim Akad
Nauk SSSR, 23, 284, 1963

The method of the invention may be carried out in a multiple-action arrangment with counter-flow. In this case, the final phase corresponds to the first action, that is to say, the action where the steam is at its highest temperature.

Each stage in the process may correspond to one or more actions, but for the sake of simplicity, such an arrangement comprises two to four actions. The number of actions may, of course, be increased if it is desirable to reduce steam-consumption costs, although it is true that capital costs would increase accordingly.

The multiple-action technique used is of any conventional type. It is widely practiced and described in a number of works, e.g., Techniques de l'Ingenieur (5 – 1951 p J 2652 – 1 ff.)

SPECIFIC DESCRIPTION OF THE INVENTION

In order to disclose more clearly the nature of the present invention, the following example illustrating the invention is given. It should be understood, however, that this is done solely by way of example and is intended neither to delineate the scope of the invention nor limit the ambit of the appended claims. In the example which follows, and throughout the specification, the quantities of material are expressed in terms of parts by weight, unless otherwise specified.

The example which follows will illustrate the process in conjunction with the appended flow diagram.

As can be seen from the diagram, the method is carried out in a triple action arrangement comprising three evaporators 1, 2 and 3. The heating vapor circuit comprises a boiler (not shown) which supplies vapor under pressure to the first evaporator through a pipe 4. A set of pipes 5, 6 and 7 permits vapor circulation countercurrent to the flow of caustic soda liquor to be concentrated, which progresses through pipes 8, 9, 10, 11, 12, 13 and 14.

The initial electrolytic cell liquor is fed through pipe 8 into a dissolving tank 15, then through pipe 9 into an evaporator 3. Sodium chloride is withdrawn from evaporator 3 through drain 16. The remaining liquor passes through pipe 10 into evaporator 2 and pure sodium chloride is again withdrawn through drain 17. Then the liquor is withdrawn through pipe 11 and fed to a decomposer 18 where the triple salt is decomposed. The salt containing sulphate is separated from decomposer 18 through an outlet 19 while the liquor is passed through pipe 12 to evaporator 1. Lastly, the final liquor is removed from evaporator 1 through pipe 13 into cooler 20. The caustic soda is then cooled, separated from the mixture of salts and particularly triple salt which crystallizes during the cooling process, and the caustic soda collected through pipe 14.

Apart from this circuit for the main circulation of the liquor, the arrangement further comprises a circuit 21 for recycling the triple salt and sodium chloride from cooler 20 to tank 15 and a circuit 22 for recycling all the solid phase from evaporator 1 to decomposer 18. It is also possible to provide a circuit 23 for recycling the solid phase from evaporator 2 to evaporator 3, a circuit 24 for recycling the sulphate salt collected in decomposer 18 to evaporator 2 and a circuit 25 for removing the salt precipitated in 2 to decomposer 18.

These various circuits, in accordance with the general description, make it possible to maximize the quantity of pure sodium chloride collected, by recycling salts such as the triple salt or a mixture of the salts through circuits 24 and 21 or 25.

Representative operating conditions are as follows:

| Initial Liquor | |
|---|---|
| NaOH | 11.2% by weight |
| NaCl | 14.5% |
| $Na_2SO_4$ | 0.6% |
| $H_2O$ | 73.6% |

The concentration of caustic soda and the operating temperatures of evaporators 1, 2 and 3 are, respectively:

| Evaporator 1 | 44% | 143° C. |
|---|---|---|
| Evaporator 2 | 22% | 85° C. |
| Evaporator 3 | 16% | 50° C. |

Finally, the concentration of caustic soda withdrawn at 14 is 50% by weight and the pure sodium chloride collected contains less than 0.05% of $Na_2SO_4$.

This example shows the importance of the invention in making it possible to obtain pure sodium chloride, optimizing yields and avoiding the hazards represented by the presence of the triple salt, which was not possible before the invention.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A method of obtaining caustic soda and pure sodium chloride from an electrolytic cell liquor containing caustic soda, sodium chloride and contaminated with sulphate ions, by concentrating the initial liquor through multiple-effect evaporation, cooling the concentrate obtained, separating the sodium chloride and the salt containing sulphate and recovering the caustic soda, wherein during a first evaporation stage the initial liquor is evaporated to a point such that it precipitates only sodium chloride and not sodium sulphate, which sodium chloride is collected and separated from the remaining liquor; that in a second evaporation stage of the remaining liquor solid phases are sequentially formed, a first primarily sodium chloride phase which is removed, a second primarily sodium sulphate phase which is removed, and a triple salt phase of caustic soda, sodium chloride and sodium sulphate by evaporation of said remaining liquor, the triple salt solid phase being separated from the remaining liquor in said second stage; said triple salt solid phase being contacted apart from an evaporation stage in a third stage, with a caustic soda solution of a concentration below 35% by weight, which is said remaining liquor from said second stage to decompose the triple salt, that the sodium chloride containing sodium sulphate is separated from the remaining decomposition liquor; that in a fourth stage said separated remaining decomposition liquor from said third stage is subjected to further evaporation to produce a solid stage which is separated from said remaining liquor; said remaining liquor from said fourth stage is finally cooled so as to precipitate a solid phase of sodium chloride, sodium sulphate and triple salt of caustic soda, sodium chloride and sodium sulphate, that the said solid phase is separated from the caustic soda solution obtained, which does not crystallize and is removed from the system as a liquor, and the said solid phase is recycled to the initial liquor.

2. A method according to claim 1, wherein the soda solution at the end of the first stage is kept close to the point of saturation with sodium sulphate.

3. A method according to claim 1, wherein part of the salt containing sulphate precipitated at the end of the second stage is removed.

4. A method according to claim 1, wherein part of the salt containing sulphate precipitated in the second stage is recycled to the first stage.

* * * * *

UNITED STATES PATENT AND TRADEMARK OFFICE
CERTIFICATE OF CORRECTION

PATENT NO. : 4,087,253
DATED : May 2, 1978
INVENTOR(S) : Guy Zabotto et al.

It is certified that error appears in the above-identified patent and that said Letters Patent are hereby corrected as shown below:

Col. 1, line 66, after "and" insert -- caustic --.

Col. 1, line 67, delete "caustic".

Col. 2, line 42, delete "caustic" and insert -- caustic -- before "soda".

Signed and Sealed this

Fifth Day of September 1978

[SEAL]

Attest:

RUTH C. MASON
Attesting Officer

DONALD W. BANNER
Commissioner of Patents and Trademarks